United States Patent
Bellemo et al.

(10) Patent No.: US 7,845,397 B2
(45) Date of Patent: Dec. 7, 2010

(54) DRYER FOR HUMID COMPRESSED GASES

(75) Inventors: Luciano Bellemo, Venice (IT); Marco Trevisan, Padua (IT)

(73) Assignee: Parker Hiross S.p.A., Sant'Angelo di Piove di Sacco (IT)

( * ) Notice: Subject to any disclaimer, the term of this patent is extended or adjusted under 35 U.S.C. 154(b) by 70 days.

(21) Appl. No.: 11/636,537

(22) Filed: Dec. 11, 2006

(65) Prior Publication Data
US 2007/0130990 A1    Jun. 14, 2007

(30) Foreign Application Priority Data
Dec. 13, 2005   (IT)   ............................ PN2005A0090

(51) Int. Cl.
*F25D 23/00*   (2006.01)
(52) U.S. Cl. .................. 165/111; 165/113; 165/167
(58) Field of Classification Search ................ 165/111, 165/112, 113, 166, 170; 62/93, 95
See application file for complete search history.

(56) References Cited

U.S. PATENT DOCUMENTS

| | | | |
|---|---|---|---|
| 3,797,565 A | | 3/1974 | Fernandes |
| 4,242,110 A | * | 12/1980 | Hynes ............................ 62/90 |
| 4,287,724 A | * | 9/1981 | Clark ........................... 165/163 |
| 5,727,623 A | * | 3/1998 | Yoshioka et al. ............. 165/113 |
| 6,085,529 A | | 7/2000 | Galus et al. |
| 6,536,511 B1 | * | 3/2003 | Nilsson et al. ............... 165/113 |
| 6,810,835 B2 | * | 11/2004 | Ishiguro et al. ............... 122/34 |
| 7,069,981 B2 | * | 7/2006 | Valensa et al. ............... 165/164 |
| 2006/0053833 A1 | * | 3/2006 | Martins et al. ............... 165/166 |
| 2007/0151276 A1 | * | 7/2007 | Bogart ......................... 165/133 |

FOREIGN PATENT DOCUMENTS

| | | |
|---|---|---|
| DE | 103 11 602 | 9/2004 |
| FR | 2 638 226 | 10/1988 |
| FR | 2846733 | * 5/2004 |

OTHER PUBLICATIONS

European Search Report issued in connection with corresponding European Application No. 06 12 4784. dated Feb. 7, 2008.
Applicants' response to European Search Report, filed May 29, 2008.

* cited by examiner

*Primary Examiner*—Teresa J Walberg
(74) *Attorney, Agent, or Firm*—Wenderoth, Lind & Ponack, L.L.P.

(57) ABSTRACT

A humid compressed-gas dryer includes a plate-type heat-exchanger that includes a plurality of stacked plates (2) associated with each other in a gas-tight manner all along the perimeter of adjacent plates (2). The adjacent plates (2) define channels (3) therebetween for two or more fluids to be guided therethrough in a heat-exchange relation. The plates and have a plurality of apertures (4, 15-21) disposed in a mutually aligned arrangement, which defines fluid conduits that extend through the heat-exchanger in fluid communication with the channels (3). The plates (2) are each formed of an aluminium sheet having a smooth surface, and a corrugated aluminium fin (5) is provided between adjacent sheets defining the channels. The fin (5) has corrugations connected to the smooth surface of the plates by brazing or a similar method. The plurality of stacked plates defines a heat recovery section (12) and a cooling section (13).

15 Claims, 5 Drawing Sheets

DRYER FOR HUMID COMPRESSED GASES

BACKGROUND OF THE INVENTION

1. Field of the Invention

The present invention refers to humid compressed-gas dryers.

2. Description of the Related Art

Compressed-gas dryers are usually employed to remove moisture from a flow of compressed gas or air.

The moisture content in a compressed gas is generally known as being the main cause of corrosion and premature breakdown of piping systems, leading eventually to a malfunction or even full unserviceableness of the machines that use such compressed gas. Therefore, in all systems that make use of compressed gas, the need arises for the moisture content thereof to be eliminated or reduced to as low a value as possible prior to such gas being supplied to the operating machines.

Dryers for humid compressed gases reduce the water content in the compressed gas by cooling the gas, for example by making use of a refrigerating circuit. The water vapor in the cooled compressed gas converts by condensation into liquid droplets that are separated from the gas with the aid of a condensate separator, which performs by removing the droplets from the flow of gas.

Known in the art are dryers for humid compressed gases that comprise a plate-type heat-exchanger formed of a stack of plates that are attached to each other by brazing along a peripheral edge thereof and have a plurality of mutually aligned apertures, which define fluid conduits that extend throughout the stack of plates to guide both the compressed gas and a refrigerant medium inside the heat-exchanger. Adjacent plates in the stack define fluid conduits therebetween, which enable a heat exchange process to take place between the compressed gas and the refrigerant medium.

The need is generally and widely felt in the art for extremely compact and small-sized compressed-gas dryers to be provided, which additionally feature adequate mechanical strength to withstand the pressure conditions which they are subject to, and are effective in ensuring an efficient heat-exchange effect between the compressed gas and the refrigerant medium flowing therethrough.

Usually, the heat-exchangers of such compressed-gas dryers are made of plates of stainless steel, or other equivalent metal alloys. On the inner surfaces of the plates, i.e., the surfaces that define the above-cited channels, there is formed a relief, i.e., projecting profile, which is aimed at increasing the turbulent flow of the fluids, so as to correspondingly increase the heat-exchange efficiency.

Generally, the pressure strength, i.e., bursting strength, must be sufficient to ensure a safety coefficient that is at least equal to five times the operating pressure. For example, at an operating pressure of 16 bar, the bursting strength should be higher than 80 bar.

It can be most readily appreciated that, where high operating pressures are used, the need arises for heat-exchangers to be employed that make use of plates of a correspondingly increased thickness, thereby causing the overall dimensions of the dryers to be increased accordingly.

The provision of a pressure-resistant condensate separator, along with the channels adapted to convey the compressed gas from the heat-exchanger to the same condensate separator, contributes to a further increase in the overall size, as well as the complexity of the dryer.

SUMMARY OF THE INVENTION

It therefore is a main object of the present invention to provide a dryer for humid compressed gases, which is particularly compact in its overall size and is at the same time able to ensure the required mechanical pressure strength, i.e., the required ability to mechanically withstand pressure.

Within this general object thereof, it is a purpose of the present invention to provide a compressed-gas dryer of the above-cited kind, which is simple to manufacture and ensures a high efficiency in the heat-exchange effect thereof.

Another purpose of the present invention is to provide a compressed-gas dryer of the above-cited kind, which is simple in its construction and is able to be manufactured at fully competitive costs.

Yet another purpose of the present invention is to provide a compressed-gas dryer of the above-cited kind, which provides a maximum extent of safety and reliability.

According to the present invention, these aims, along with further ones that will become apparent from the description provided below, are reached in a humid compressed-gas dryer incorporating the characteristics set forth in the appended claims.

BRIEF DESCRIPTION OF THE DRAWINGS

Further characteristics, features and advantages of the present invention will be more readily understood from the detailed description of a preferred, although not sole embodiment that is provided below by way of a non-limiting example with reference to the accompanying drawings, in which.

DETAILED DESCRIPTION OF THE INVENTION

With reference to the above-cited figures, the compressed-gas dryer according to the present invention comprises a plate-type heat exchanger including a plurality of stacked plates 2 that are associated with each other in a fluid-tight manner all along the perimeter of adjacent plates 2. The adjacent plates 2 define channels 3 therebetween for two or more fluids to be guided therethrough in a heat-exchange relation. The plates (2) have a plurality of apertures 4, 15-21 in a mutually aligned arrangement to define fluid conduits that extend through the heat-exchanger in fluid communication with the channels 3.

Each such plate 2 is formed of an aluminium sheet having a smooth surface, and a corrugated aluminium fin (5) is provided between adjacent sheets defining the channels 3.

The fin 5 comprises corrugations connected to the smooth surface of the sheets by brazing or a similar method.

The heat exchanger comprises a heat recovery section 12 adapted to pre-cool a humid compressed gas, and a cooling section 13 adapted to cool down the pre-cooled humid compressed gas until it reaches a pre-established dew point.

The aluminium plates 2 are placed upon each other and associated with each other into a stack, and then sealed relative to each other by brazing them along a folded border 6 that extends around the perimeter of each plate 2.

The channels 3 are defined between stacked adjacent plates 2. The fluids are then able to flow in the channels 3 in a mutual heat-exchange relation along a flow-path following a main direction of flow F.

The mutually aligned apertures 4, 15-21 of the plates 2 are adapted to properly form—once the heat exchanger is appropriately assembled and brazed together—the fluid conduits through which the fluids are guided into and out of the respective channels 3 to perform the heat-exchange process, i.e. exchange of heat with each other.

In particular, fluids at different temperatures are adapted to flow in a counter-current mode through adjacent channels 3, thereby bringing about a heat-exchange effect through the plate 2 that separates such channels 3.

The corrugated fin 5 is arranged between adjacent plates 2, inside the channels 3, and is provided with a sequence of corrugations, comprised of ridges 7 and hollows, i.e. valleys 8, which are connected by brazing to the smooth surface of the adjacent plates 2 defining such fluid channels 3.

Figures 1, 2:
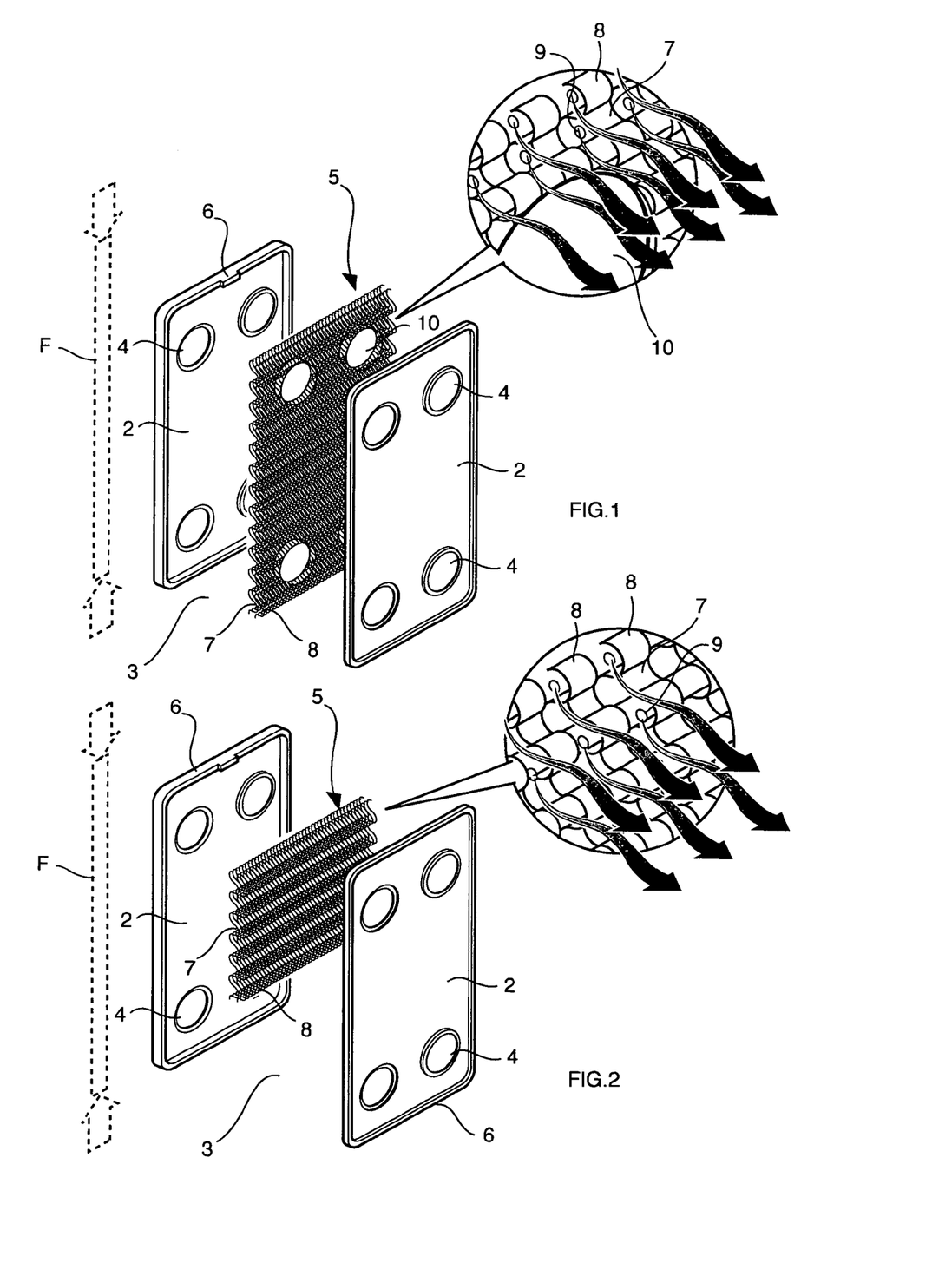
FIG. 1 is an exploded view of the plated and the corrugated fin forming the heat exchanger of a compressed-gas dryer according to the present invention.
FIG. 2 is an exploded view similar to FIG. 1, however illustrating a corrugated fin according to an alternative embodiment of the present invention.

The ridges 7 and the valleys 8 of the corrugated fins 5 are arranged in a sequence so that they follow each other in a direction that is substantially parallel to the main flow direction F of the fluids inside the channels 3, as best shown in FIGS. 1 and 2.

A plurality of perforations 9 are provided in the ridges 7 and the valleys 8 of each corrugated fin 5 and through such perforations the fluids flow so as to circulate in a heat-exchange relation inside the channel 3.

Advantageously, the fins 5 increase the flow turbulence of the fluid passing through the channel 3, as well as the heat-exchange surface area, thereby increasing the efficiency of the heat-exchange process.

The fin 5 enables the brazing surface between adjacent plates 2 to be increased, thereby improving not only the attachment of the aluminium plates 2 to each other, but also the overall mechanical strength of the heat exchanger, while making the brazing operation itself simpler and quicker to perform.

According to a preferred embodiment of the present invention, there is provided a more extended, i.e. larger corrugated fin 5 that occupies the entire channel 3 between adjacent plates 2 and has apertures 10 corresponding to and aligned with the apertures 4, 15-21 provided in the plates 2, as best shown in FIG. 1.

According to a further preferred embodiment of the present invention, there is provided a less extended, i.e. smaller corrugated fin 5 that solely occupies a central portion of the channel 3, so as to leave a free passage around the apertures 4, 15-21 and avoid interfering with the fluid conduits defined by the same apertures in the plates 2, as this is illustrated in FIG. 2. This particular embodiment of the invention is particularly advantageous since it enables localized pressure drops due to flow resistance to be reduced and the distribution of the fluid flowing in the channel 3 to be improved.

According to the present invention, the plates 2 and the corrugated fins 5 are assembled together so as to form a multi-circuit heat exchanger 11 comprising a heat recovery section 12 and a cooling section 13.

Figure 3:
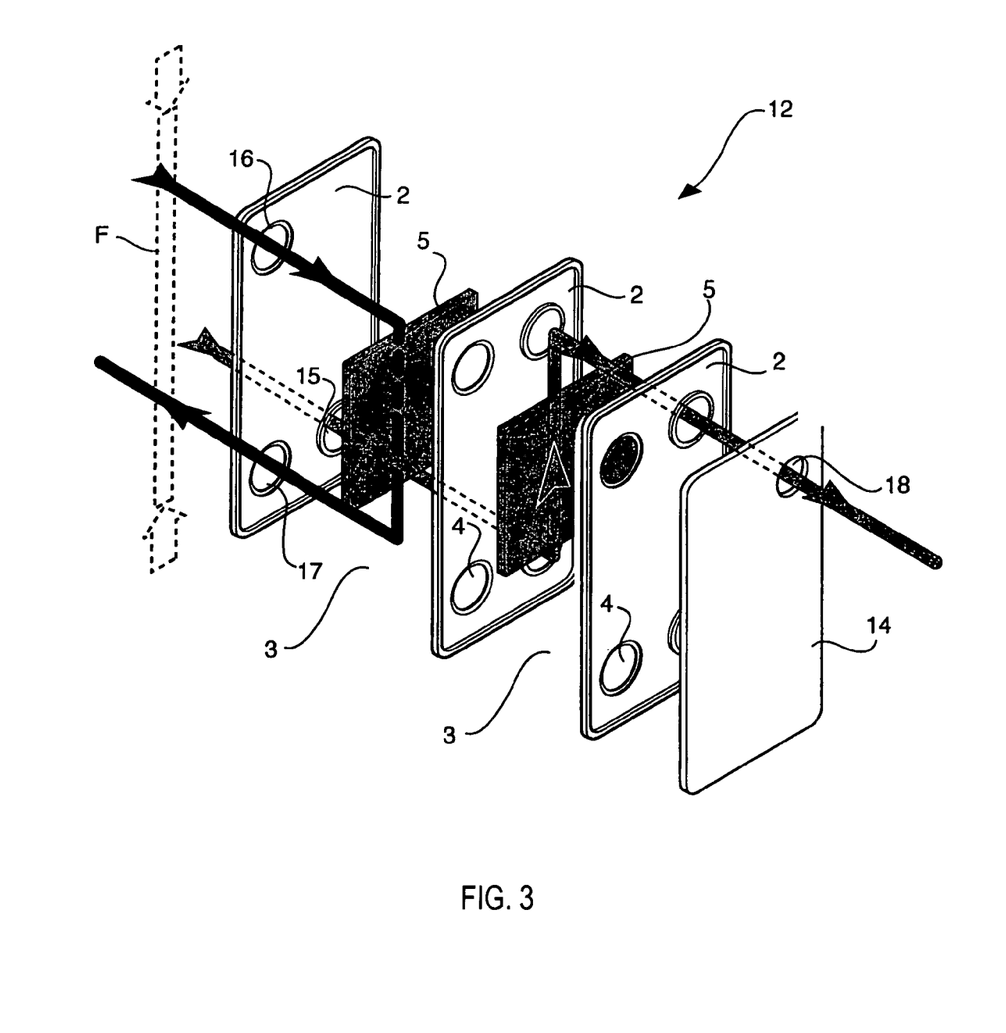
FIG. 3 is a perspective exploded view of the heat recovery section of the heat exchanger of the compressed-gas dryer according to the present invention, under special indication of the flow-paths followed by the fluids in a heat-exchange relation to each other.
Figure 4:
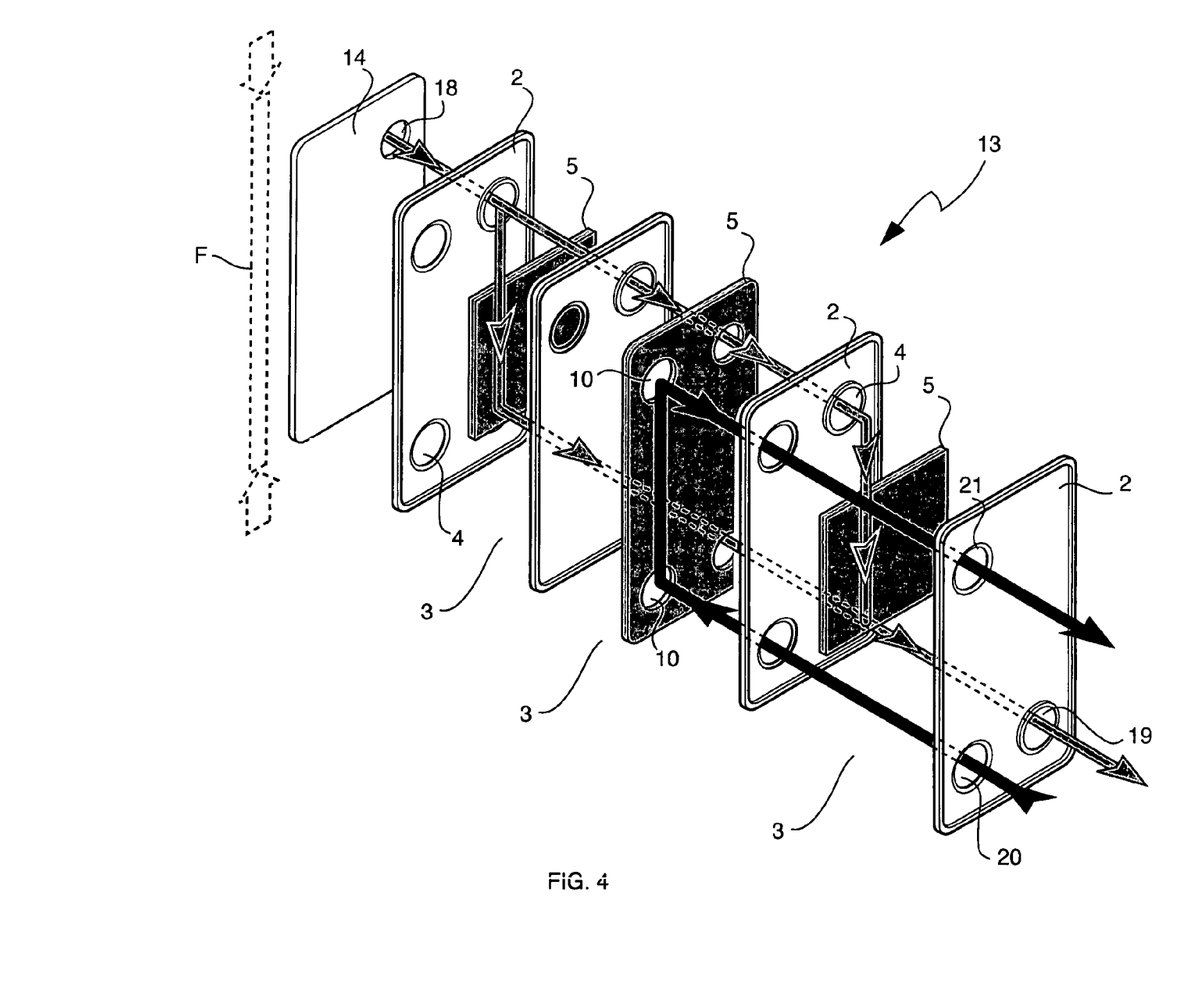
FIG. 4 is a perspective exploded view of the cooling section of the heat exchanger of the compressed-gas dryer according to the present invention, under special indication of the flow-paths followed by the fluids in a heat-exchange relation to each other.

In FIGS. 3 and 4 there are shown detailed illustrations of a portion of the heat recovery section 12, a portion of the cooling section 13, along with the flow patterns of the fluids exchanging heat with each other, respectively.

The heat recovery section 12 is adapted to perform a heat-exchange process between a humid, i.e. moisture-laden hot compressed gas entering the heat exchanger 11, as it may for instance be flowing in from a pneumatic compressor, and a cooled-down compressed gas flowing in from the cooling section, to pre-cool said humid hot compressed gas and post-heat the cooled-down compressed gas prior to the latter leaving the heat exchanger 11.

The cooling section 13 is in turn adapted to perform a heat-exchange process between the humid pre-cooled compressed gas flowing in from the heat recovery section 12 and a refrigerant medium adapted to circulate in the cooling section 13 to cool down the compressed gas until the water vapor contained therein is caused to condense. The thus cooled gas is then sent to the heat recovery section 12 for it to be post-heated there.

The heat recovery section 12 is provided with an inflow aperture 15, through which the humid hot compressed gas to be dried flows into the heat exchanger 11 to be directed to the respective fluid channels 3.

The heat recovery section 12 is further provided with an inflow port 16, through which the cooled gas flowing in from the cooling section 13 is conveyed to the respective fluid channels 3 to be post-heated, as well as an outflow aperture 17, through which the thus post-heated cooled gas flowing in from the respective fluid channels 3 is able to exit the heat exchanger 11.

The heat recovery section 12 and the cooling section 13 communicate with each other via a through-aperture 18 provided in a partition plate 14, which enables the pre-cooled gas to flow, i.e. pass into the cooling section 13. Such a partition plate may be comprised of an aluminium sheet in the same manner as the other plates forming the heat exchanger 11.

The cooling section 13 is provided with an outflow port 19, through which the cooled gas flowing in from the respective fluid channels exits the cooling section 13 to be sent to the inflow port 16 of the heat recovery section 12.

The cooling section 13 is further provided with an inflow port 20 and an outflow port 21, through which the refrigerant medium from a refrigerating circuit is caused to circulate in the respective fluid channels 3 to remove heat from the pre-cooled gas and to be eventually returned to the refrigerating circuit.

The humid hot compressed gas flowing into the heat exchanger 11 through the inflow port 15 is adapted to be pre-cooled in the heat recovery section 12 and be then sent, via the through-aperture 18, to the cooling section 13, where it undergoes further cooling, due to the action of the refrigerant medium, until it reaches the pre-established dew point so as to cause the water vapor to condense into liquid droplets.

The refrigerant medium may be an evaporating refrigerant medium, as handled by the refrigerating circuit, or a medium that does not undergo any change of state during the heat-exchange process, such as for instance a glycol-water mixture, which is in turn cooled down by means of a refrigerating circuit.

The cooled compressed gas, along with the liquid droplets carried by it, exits the cooling section 13 of the heat exchanger 11 through the outflow port 19 to eventually reach a condensate separator arrangement, or condensate trap, in which the condensed water vapor is separated from the compressed gas. The condensate itself is collected into the bottom portion of the condensate separator arrangement and let off by means of a drain device.

The cooled and dried compressed gas flowing out from the condensate separator arrangement is then sent—through the inflow port 16—to the heat recovery section 12, where the humid hot compressed gas flowing into the heat exchanger is pre-cooled, whereas the cooled and dried compressed gas is post-heated prior to it leaving the heat exchanger 11 through the outflow aperture 17, as directed to the final utilization thereof.

Advantageously, according to a preferred embodiment of the present invention, between the adjacent plates 2 that define the channels 3, in which the compressed gas is adapted to flow, there is provided a corrugated fin 5 featuring a smaller extension, whereas between the adjacent plates 2 that define the channels 3, in which the refrigerant medium is adapted to flow, there is provided a corrugated fin 5 featuring a larger extension.

Figure 6:
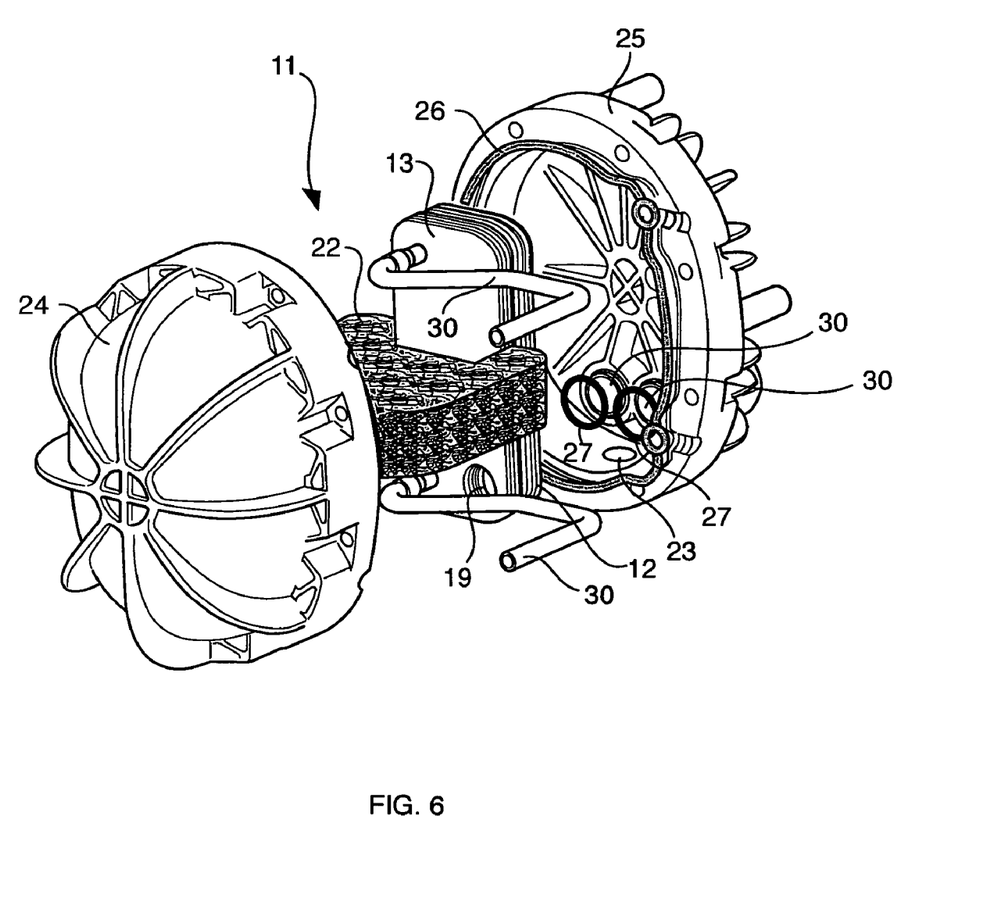
FIG. 6 is a perspective view of the refrigeration-based compressed-gas according to the present invention.

In a preferred embodiment, a refrigeration-based compressed-gas dryer comprises a multi-circuit heat exchanger as set forth and discussed above, as well as a condensate separator or trap means 22, e.g. a demister-type one, wherein both the heat exchanger and the condensate separator are contained in a pressure-resistant housing, so that the condensate separator means 22 is adapted to intercept the cooled compressed gas circulating inside the housing, from the outflow port 19 of the cooling section 13 to the inflow port 16 of the heat recovery section 12.

The housing comprises manifold means 30 that are associated in a gas-tight manner to the inflow aperture 15 and the outflow aperture 17 of the heat recovery section 12 to both deliver the compressed gas to be dried to the heat exchanger 11 and remove the dried compressed gas from the heat exchanger. These manifold means 30 are furthermore associated to the inflow aperture 20 and the outflow aperture 21 of the cooling section 13 so as to enable the refrigerant medium to be circulated between respective fluid channels 3 and the refrigerating circuit.

The housing also comprises a drain hole 23, provided in a zone where the liquid droplets tend to collect, so as to allow the condensate collecting therein to be let off to the outside of the housing. An outlet or drain device, e.g. such device of the floating type, connected to the outlet hole 23, is provided to remove from the vessel the separated liquid particles that collect thereinto.

Such a drain device may be arranged either outside or inside the housing, according to the actual needs.

In a preferred embodiment, the housing comprises a pressure vessel comprised of a first half-shell 24 and a second half-shell 25 adapted to be associated with each other in a gas-tight manner with the aid of fastening means, so as to define a cavity in which the heat exchanger 11 is arranged and accommodated.

Figure 5:
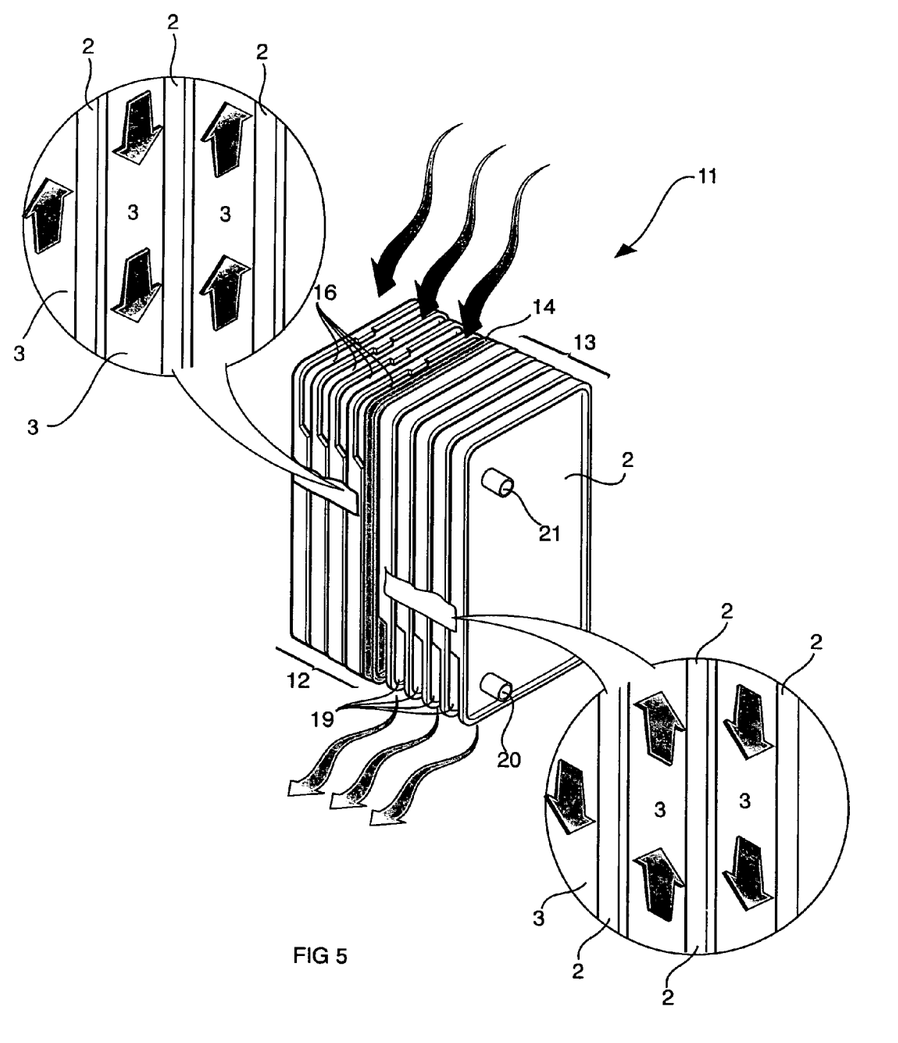
FIG. 5 is a perspective view of the heat exchanger of the compressed-gas dryer according to a further embodiment of the present invention, under special indication of the slits forming the intake or inlet opening of the heat recovery section and the slits forming the outlet opening of the cooling section of the heat exchanger.

In an alternative and highly preferred embodiment of the present invention, the inflow port 16 is constituted by a plurality of slits provided between adjacent plates 2 in correspondence to the fluid channels 3 of the heat recovery section 12, adapted to be flown through by the dried compressed gas to be post-heated.

These slits are adapted to deliver the dried compressed gas circulating inside the vessel directly into the fluid channels 3 of the heat recovery section 12.

In another alternative and highly preferred embodiment of the present invention, the outflow port 19 is constituted by a plurality of slits provided between adjacent plates 2 in correspondence to the fluid channels 3 of the cooling section 13, adapted to be flown through by the compressed gas.

These slits are adapted to let the cooled compressed gas, after it has exchanged heat with the refrigerant medium, directly into the cavity of the vessel.

These slits are intended to reduce pressure losses; in addition, the slits provided in the cooling section 13 also enable the separation of the condensed liquid particles from the flow of cooled compressed gas to be facilitated.

Sealing means 26 are provided to ensure a gas-tight assembly of the half-shells 24, 25 together, whereas fastening means are provided to appropriately secure the heat exchanger 11 inside the cavity of the resulting vessel.

Sealing means of the O-ring type 27 are provided between the manifold means 30 and the inflow aperture 15, as well as between the manifold means 30 and the outflow aperture 17 so as to ensure a gas-tight coupling thereof and prevent compressed gas from by-passing, i.e. leaking between said apertures 15, 17.

Fully apparent from the above description is therefore the ability of the present invention to effectively reach the aims and advantages cited afore by providing a refrigeration-based dryer for humid compressed gases that is particularly compact in its size and is highly resistant to pressure.

The compressed-gas dryer according to the present invention is reliable and particularly simple from a construction point of view, ensuring a high drying capacity at a high efficiency.

In addition, according to the present invention, in the embodiment calling for the heat exchanger to be contained in a housing, the pressure inside the heat exchanger and the pressure outside the heat exchanger are substantially the same, i.e. amount to substantially the same value, the only difference from each other possibly amounting to the value of the pressure losses in the flow of compressed gas circulating in the sections 12, 13 of the heat exchanger 11.

The possibility is therefore given for a dryer to be provided, which comprises a heat exchanger using extremely thin plates, since it is the pressure vessel that ensures the required mechanical pressure strength of the whole assembly, whereas the heat exchanger itself shall not necessarily be given a specially pressure-resistant construction.

Such a vessel or housing adapted to resist pressure does away with the need for conduits to be used to guide the compressed gas between the heat exchanger and the condensate separator arrangement.

Since the above-cited housing contains both the heat exchanger and the condensate separator arrangement, there is no longer any need for the condensate separator arrangement to be sealingly enclosed in a pressure-resistant housing of its own, in which the cooled compressed gas flowing in from the afore-cited conduits should be caused to pass through.

It will be readily appreciated that the heat exchanger according to the present invention may be subject to a number of modifications, and may be embodied in a number of manners differing from the exemplary ones described above, without departing from the scope of the present invention. It will furthermore be appreciated that all details as described hereinbefore may be replaced by technically equivalent elements, wherein the materials used for these elements and the sizing thereof may be appropriately selected each time in accordance with the actual needs or to comply with particular requirements.

The invention claimed is:

1. A dryer for humid compressed gases comprising:
   a pressure resistant sealed housing;
   a plate-type heat exchanger disposed in said housing, said plate type heat exchanger having a heat recovery section and a cooling section that are comprised of a plurality of stacked plates that are sealed relative to each other in a gas-tight manner, said heat recovery section including an inflow port and said cooling section including an outflow port; and
   a condensate separator positioned in said housing so as to intercept cool compressed air circulating inside said housing from said outflow port of said cooling section to said inflow port of said heat recovery section,
   wherein adjacent stacked plates define channels therebetween for two or more fluids to be guided therethrough in a heat-exchange relation such that a direction of the fluid in adjacent ones of the channels are opposite to one another,
   wherein each of said stacked plates includes at least one aperture that is mutually aligned with an aperture of an adjacent stacked plate so as to form a fluid conduit that extends through said plate-type heat exchanger in fluid communication with said channels, and
   wherein said dryer is configured such that compressed gases exit said cooling section and said heat recovery section of said heat exchanger into said housing and then pass through said condensate separator.

2. The dryer for humid compressed gases according to claim 1,
   wherein said heat recovery section further comprises an inflow aperture and an outflow aperture,
   said housing further comprises:
      a first manifold passage that is connected in a gas-tight manner to said outflow aperture of said heat recovery section so as to remove dried compressed gas from said heat exchanger,
      a second manifold passage that is connected in a gas-tight manner to said inflow aperture of said heat recovery section section so as to deliver compressed gas to be dried to said heat exchanger,
      a first manifold tube that is connected to an outflow aperture of said cooling section, said first manifold tube enabling a refrigerant medium to be circulated between said channels and a refrigerating circuit, and
      a second manifold tube that is connected to an inflow aperture of said cooling section, said second manifold tube enabling the refrigerant medium to be circulated between said channels and a refrigerating circuit.

3. The dryer for humid compressed gases according to claim 2, wherein said housing further comprises a drain hole provided in a zone where liquid droplets collect, said drain hole permitting the liquid droplets to exit said housing.

4. The dryer for humid compressed gases according to claim 2, wherein said inflow port comprises a plurality of slits that are provided between adjacent stacked plates in correspondence to said channels of said heat recovery section, said plurality of slits being adapted to deliver dried compressed gas circulating inside said housing into said channels of said heat recovery section for post heating the dried compressed gas.

5. The dryer for humid compressed gases according to claim 2, wherein said outflow port of said cooling section comprises a plurality of slits provided between adjacent plates in correspondence to fluid channels of said cooling section, said plurality of slits permitting the cooled compressed gas to flow from said cooling section into said housing.

6. The dryer for humid compressed gases according to claim 2, wherein sealing means are provided between said manifold tube and said inflow aperture, and between said manifold tube and said outflow aperture, so as to ensure a gas-tight coupling thereof and prevent compressed gas from leaking from said inflow aperture and said outflow aperture.

7. The dryer for humid compressed gases according to claim 2, wherein said inflow port comprises a first plurality of slits that are provided between adjacent stacked plates in correspondence to said channels of said heat recovery section, said first plurality of slits being adapted to deliver dried compressed gas circulating inside said housing into said channels of said heat recovery section for post heating the dried compressed gas,
   wherein said outflow port of said cooling section comprises a second plurality of slits provided between adjacent plates in correspondence to fluid channels of said cooling section, said second plurality of slits permitting the cooled compressed gas to exit said heat exchanger into said housing, and
   wherein said condensate separator is positioned to intercept cool compressed air which exits said heat exchanger from said outflow port of said cooling section.

8. The dryer for humid compressed gases according to claim 2, wherein said heat exchanger is configured such that the refrigerant medium is not circulated through said heat recovery section.

9. The dryer for humid compressed gases according to claim 2, wherein said heat exchanger is configured such that said condensate separator is upstream of said inflow port of said heat recovery section, said outflow port of said cooling section is upstream of said condensate separator, and said inflow aperture of said heat recovery section is upstream of said outflow port of said cooling section.

10. The dryer for humid compressed gases according to claim 2, wherein said heat exchanger is configured such that said inflow port of said heat recovery section is upstream of said outflow aperture of said heat recovery section, said condensate separator is upstream of said inflow port of said heat recovery section, said outflow port of said cooling section is upstream of said condensate separator, and said inflow aperture of said heat recovery section is upstream of said outflow port of said cooling section.

11. The dryer for humid compressed gases according to claim 1, wherein said condensate separator is positioned to intercept cool compressed air which exits said heat exchanger from said outflow port of said cooling section.

12. The dryer for humid compressed gases according to claim 1, wherein said condensate separator is disposed externally of said heat exchanger and inside of said housing.

13. A dryer for humid compressed gases comprising:
   a pressure resistant sealed housing;
   a plate-type heat exchanger disposed in said housing, said plate type heat exchanger having a heat recovery section and a cooling section that are comprised of a plurality of stacked plates that are sealed relative to each other in a gas-tight manner, said heat recovery section including an inflow port and said cooling section including an outflow port; and
   a condensate separator positioned in said housing so as to intercept cool compressed air circulating inside said housing from said outflow port of said cooling section to said inflow port of said heat recovery section, wherein adjacent stacked plates define channels therebetween for two or more fluids to be guided therethrough in a heat-exchange relation such that a direction of the fluid in adjacent ones of the channels are opposite to one another, wherein each of said stacked plates includes at least one aperture that is mutually aligned with an aperture of an adjacent stacked plate so as to form a fluid conduit that extends through said plate-type heat exchanger in fluid communication with said channels, wherein said heat recovery section further comprises an inflow aperture and an outflow aperture, wherein said housing further comprises:
- a first manifold passage that is connected in a gas-tight manner to said outflow aperture of said heat recovery section so as to remove dried compressed gas from said heat exchanger,
- a second manifold passage that is connected in a gas-tight manner to said inflow aperture of said heat recovery section section so as to deliver compressed gas to be dried to said heat exchanger,
- a first manifold tube that is connected to an outflow aperture of said cooling section, said first manifold tube enabling a refrigerant medium to be circulated between said channels and a refrigerating circuit, and
- a second manifold tube that is connected to an inflow aperture of said cooling section, said second manifold tube enabling the refrigerant medium to be circulated between said channels and a refrigerating circuit; and wherein said dryer is configured such that compressed gases first enter said heat exchanger through said inflow aperture of said heat recovery section, and exit said heat recovery section through said outflow aperture of said heat recovery section into said cooling section.

14. The dryer for humid compressed gases according to claim 13, wherein said dryer is configured such that cool compressed air exits said heat exchanger through said outflow port of said cooling section, passes through said condensate separator, and then re-enters said heat exchanger through said inflow port of said heat recovery section.

15. A dryer for humid compressed gases comprising:
- a pressure resistant sealed housing;
- a plate-type heat exchanger disposed in said housing, said plate type heat exchanger having a heat recovery section and a cooling section that are comprised of a plurality of stacked plates that are sealed relative to each other in a gas-tight manner, said heat recovery section including an inflow port and said cooling section including an outflow port; and
- a condensate separator positioned in said housing so as to intercept cool compressed air circulating inside said housing from said outflow port of said cooling section to said inflow port of said heat recovery section, wherein adjacent stacked plates define channels therebetween for two or more fluids to be guided therethrough in a heat-exchange relation such that a direction of the fluid in adjacent ones of the channels are opposite to one another, wherein each of said stacked plates includes at least one aperture that is mutually aligned with an aperture of an adjacent stacked plate so as to form a fluid conduit that extends through said plate-type heat exchanger in fluid communication with said channels, and wherein said dryer is configured such that compressed gases flow from said heat recovery section to said cooling section, from said cooling section through said condensate separator, and from said condensate separator back into said heat recovery section.

* * * * *